United States Patent Office 3,033,881
Patented May 8, 1962

3,033,881
PROCESS FOR THE MANUFACTURE OF A NEW DEXAMETHASONE ESTER
Albert Wettstein, Georg Anner, Charles Meystre, Peter Wieland, Ludwig Ehmann, Karl Heusler, Alfred Hunger, and Jindrich Kebrle, Basel, Switzerland, assignors to Ciba Pharmaceutical Products Inc., Summit, N.J.
No Drawing. Filed July 1, 1959, Ser. No. 824,201
Claims priority, application Switzerland July 4, 1958
3 Claims. (Cl. 260—397.45)

The present invention relates to a new ester of dexamethasone, viz the 21-trimethyl acetate of $\Delta^{1,4}$-16α-methyl-9α-fluoro - pregnadiene - 11β:17α:21 - triol - 3:20-dione, and a process for its manufacture.

The new ester is distinguished from other dexamethasone esters by an especially favorable, protracted effect and is therefore particularly suitable for the topical administration of this highly active anti-inflammatory corticosteroid.

Trimethyl acetates of steroids have already been prepared, for example the trimethyl acetates of testosterone, or those of cortisone, hydrocortisone, prednisone and prednisolone. These esters were prepared by simply reacting the free hydroxyl compound with a trimethyl-acetic acid halide in pyridine, if desired with the addition of a diluent. After mixing the reaction components, the whole was usually allowed to stand for several hours in order to attain complete esterification.

It was surprisingly found that under these known reaction conditions the trimethyl acetate of $\Delta^{1,4}$-16α-methyl-9α-fluoro-pregnadiene - 11β:17α:21 - triol - 3:20-dione can only be obtained in a very poor yield. A more thorough examination of the course of the reaction showed that, directly after mixing the reaction components in pyridine, a sample of the reaction solution dabbed onto filter paper, developed according to the methods of paper chromatography with blue tetrazolium and dilute sodium hydroxide solution (R. Neher, Chromatographie von Sterinen, Steroiden und verwandten Verbindungen, Amsterdam 1958, page 57), exhibited no blue coloration, and only 35 minutes after dabbing, a blue coloration appeared gradually owing to the progressing hydrolysis of the trimethyl acetate by the action of the strongly alkaline indicator. By contrast, a 5% solution of $\Delta^{1,4}$-16α - methyl-9α - fluoro - pregnadiene-11β:17α:21-triol-3:20-dione in pyridine, gave, with the same detection method, a deep blue coloration within 3 to 4 seconds. A sample of the reaction solution, taken directly after mixing the reaction components shows a unitary spot in the ultraviolet light in a film chromatogram (E. Stahl, Chemiker-Zietung 82, 323 (1958)) on silicagel and developed in the benzene-ethyl acetate (8:2) system with sulfuric acid of 50% strength (15 minutes at 90° C.) as indicator. Neither starting material nor by-products can be detected. Five hours after mixing the reaction components a sample of the reaction solution shows the formation of considerable quantities of by-products in the film chromatogram. After a reaction time of 60 hours no trimethyl acetate of dexamethasone at all can be isolated by crystallization. Thus in the process as described in Example 3, a compound different from dexamethasone-trimethyl acetate is obtained.

It has now been found that the 21-trimethyl-acetate of $\Delta^{1,4}$-16α-methyl-9α-fluoro - pregnadiene - 11β:17α:21-triol-3:20-dione can be obtained in excellent yield by reacting $\Delta^{1,4}$ - 16α - methyl - 9α - fluoro - pregnadiene-11β:17α:21-triol-3:20-dione in pyridine with excess trimethylacetic acid chloride and destroying the excess acylating agent as soon as no more starting material is detectable.

It is of advantage to add $\Delta^{1,4}$-16α-methyl-9α-fluoro-pregnadiene-11β:17α:21-triol - 3:20 - dione slowly to a cooled solution of trimethyl-acetic acid chloride in pyridine and destroy the excess acid chloride by adding water immediately after the above addition is complete. The ester formed is precipitated and thus withdrawn from the action of the acid chloride not yet destroyed. It is, however, possible to destroy the acid chloride by adding a primary alcohol, such as methanol, ethanol or propanol and then to work up by extraction with a suitable solvent, for example methylene chloride, chloroform, benzene, ethyl acetate or the like.

The new compounds can be used as medicaments, for example in the form of pharmaceutical preparations which contain the active substance in admixture with a pharmaceutical organic or inorganic, solid or liquid carrier suitable for enteral or parenteral administration. As carriers such substances come into consideration as do not react with the new compounds, such as for instance water, gelatine, lactose, starch, magnesium stearate, talc, vegetable oils, benzylalcohols, gums, polyalkylene glycols, cholesterol or other known carriers. The pharmaceutical preparations can be in the form, for instance of tablets or dragees, or in liquid form as solutions, suspensions or emulsions. They may be sterilized and/or contain auxiliary substances, such as preserving, stabilizing, wetting or emulsifying agents, salts for the modification of osmotic pressure or buffers. They may also contain other therapeutically useful substances. The preparations are obtained in the customary way.

The following examples illustrate the invention:

*Example 1*

0.090 gram of 1 - dehydro - 9α - fluoro - 16α - methylhydrocortisone is dissolved in 2 cc. of dry pyridine and after adding 0.2 cc. of trimethyl-acetic acid chloride allowed to stand for 24 hours at room temperature. The whole is poured into ice-water and extracted with a mixture of tetrahydrofuran and chloroform (2:3). The extract is washed free from pyridine with dilute hydrochloric acid, then agitated with water, dilute sodium carbonate solution and again with water, dried over sodium sulfate and evaporated. The crystalline residue is once boiled with methylene chloride and 0.029 gram of 1-dehydro - 9α - fluoro - 16α - methylhydrocortisone - 21-trimethylacetate melting at 236–237° C. is obtained. According to the analysis by paper chromatography using formamide/benzene and formamide/benzene-chloroform as solvent systems the recrystallized product still contains an appreciable amount of a more polar by-product.

*Example 2*

400 cc. of pure, dry pyridine are cooled to 0° C. under nitrogen. 88.8 cc. of trimethylacetic acid chloride (boiling point 104–104 ½° C. under 750 mm. of pressure, $n_D^{25°}$=1.4103, sulfur content 0.0145%) are added dropwise in the course of 10–12 minutes at 0° C. internal temperature with stirring and external cooling. A solution of 40.0 grams of $\Delta^{1,4}$-16α-methyl-9α-fluoro-pregnadiene-11β:17α:21-triol-3:20-dione in 400 cc. of pure, dry pyridine is then added dropwise in the course of 20 minutes at 0° C. internal temperature with stirring and external cooling. The reaction solution becomes increasingly turbid and crystalline pyridine-hydrochloride separates.

As soon as the addition of the steroid solution has been completed, the reaction solution is poured with stirring onto a mixture of 2000 grams of finely crushed, clean ice and 2000 cc. of distilled water, the reaction product precipitating. The ice is allowed to thaw in the course of 2-3 hours with stirring and the product is then filtered with suction. The crystallizate is stirred successively with dilute hydrochloric acid and water for a short time, filtered with suction each time, and finally washed neutral with ample water and dried under reduced pressure at 70–80° C. The yield amounts to 46.9 grams of $\Delta^{1,4}$ - 16α - methyl - 9α - fluoro - pregnadiene-11β:17α:21-triol-3:20-dione-21-trimethyl acetate, corresponding to 96.6% of the theoretical yield, calculated on the unesterified steroid alcohol. After recrystallization from a mixture of chloroform and benzene 45.1 grams of $\Delta^{1,4}$ - 16α - methyl - 9α-fluoro-pregnadiene-11β:17α:21-triol-3:20-dione-21-trimethyl acetate are obtained corresponding to 92.9% of the theoretical yield. Melting point=262–263°; optical rotation $[\alpha]_D^{27} = +84.9 \pm 0.9°$ (c=1.4% in dioxane). $\lambda_{max}$. (rectified spirit) 240mμ, ε=15,800. Paper chromatogram: unitary, neither by-products nor starting material detectable; system form-amide-benzene-chloroform: $R_F$=0.8–0.9. System form-amide-benzene: $R_F$=0.4–0.7. Elementary analysis: $C_{27}H_{37}O_6F$ Calc. C, 68.04; H, 7.83%. Found: C, 68.02; H, 7.79%.

*Example 3*

10.0 grams of $\Delta^{1,4}$-16α-methyl-9α-fluoro-pregnadiene-11β:17α:21-triol-3:20-dione are reacted with 22.2 cc. of trimethylacetic acid chloride as described in the preceding example. The reaction solution is allowed to stand for 60 hours under nitrogen. The pyridine is then evaporated to a great extent under reduced pressure by means of a centrifugal film still, the residue is taken up in chloroform, the solution washed with dilute hydrochloric acid and water, dried and evaporated. The partially crystalline residue yields after recrystallization from benzene no trimethyl acetate of $\Delta^{1,4}$-16α-methyl-9α-fluoro-pregnadiene-11β:17α:21-triol-3:20-dione but 2.6 grams of a crystallizate melting at 256–258° C.; optical rotation $$[\alpha]_D^{25} = 42.2°$$

(c=1% in dioxane), $\lambda_{max}$. (rectified spirit) 240 mμ, ε=14,700. Mixed melting point test with $\Delta^{1,4}$-16α-methyl-9α-fluoro-pregnadiene-11β:17α:21-triol-3:20 - dione - 21-trimethyl acetate of the preceding example: M.P. 240–241° C. Paper chromatogram: unitary; system formamide-benzene-chloroform: $R_F$=0.3–0.4; system formamide-benzene: $R_F$=0.1–0.18; elementary analysis: C, 65.5 and H, 7.70%.

*Example 4*

Oil ampoules (for injection):

| | |
|---|---:|
| $\Delta^{1,4}$ - 16α - methyl - 9α - fluoro - pregnadiene-11β:17α:21-triol-3:20 - dione - 21 - trimethyl-acetate _____mg | 15 |
| Netural sesame oil free from peroxide to make _____cc | 1 |

*Example 5*

Crystal ampoules (for injection):

| | |
|---|---:|
| $\Delta^{1,4}$ - 16α - methyl - 9α - fluoro - pregnadiene-11β:17α:21-triol-3:20-dione - 21 - trimethyl acetate _____mg | 15 |
| Sodium carboxymethyl-cellulose _____mg | 5 |
| Sodium chloride _____mg | 7.50 |
| Primary sodium phosphate _____mg | 2 |
| Merthiolate _____mg | 0.01 |
| Tween 20 _____mg | 1.00 |
| Distilled water to make _____cc | 1.00 |

*Example 6*

Tablets:

| | Mg. |
|---|---:|
| $\Delta^{1,4}$-16α-methyl - 9α - fluoro - pregnadiene-11β:17α:21-triol-3:20-dione-21 - trimethyl-acetate _____ | 5.00 |
| Lactose _____ | 115.00 |
| Gelatine _____ | 2.00 |
| Starch _____ | 67.00 |
| Magnesium stearate _____ | 0.60 |
| Talc _____ | 10.40 |
| | 200.00 |

*Example 7*

Ointment:

| | Percent |
|---|---:|
| $\Delta^{1,4}$-16α - methyl - 9α - fluoro - pregnadiene-11β:17α:21-triol-3:20-dione - 21 - trimethyl acetate _____ | 0.05 |
| Cetyl alcohol _____ | 0.5 |
| Wool fat _____ | 5.0 |
| Water _____ | 5.0 |
| Benzyl alcohol _____ | 0.5 |
| Paraffin oil _____ | 20.0 |
| Petroleum jelly to make _____ | 100.0 |

What is claimed is:

1. Process for the manufacture of a new dexamethasone ester which comprises reacting $\Delta^{1,4}$-16α-methyl-9α-fluoro-pregnadiene-11β:17α:21-triol-3:20-dione in pyridine with excess trimethylacetic acid chloride and destroying the excess acylating agent as soon as starting material is no longer detectable.

2. Process according to claim 1 which comprises adding a pyridine solution of $\Delta^{1,4}$-16α-methyl-9α-fluoro-pregnadiene-11β:17α:21-triol-3:20-dione to an excess of trimethylacetic acid chloride in pyridine at 0° C. and destroying the acylating agent as soon as the addition is completed.

3. Process according to claim 1 which comprises destroying the excess acylating agent by the addition of water.

References Cited in the file of this patent

UNITED STATES PATENTS

| | | |
|---|---|---|
| 2,783,226 | Gould et al. | Feb. 26, 1957 |
| 2,813,108 | Hanze | Nov. 12, 1957 |

OTHER REFERENCES

Arth et al.: J. Am. Chem. Soc., vol. 80, p. 3162 (June 1958).